(12) United States Patent
Venkitapathi et al.

(10) Patent No.: US 10,530,666 B2
(45) Date of Patent: Jan. 7, 2020

(54) METHOD AND SYSTEM FOR MANAGING PERFORMANCE INDICATORS FOR ADDRESSING GOALS OF ENTERPRISE FACILITY OPERATIONS MANAGEMENT

(71) Applicant: CARRIER CORPORATION, Jupiter, FL (US)

(72) Inventors: Prabhu Raja Subbarayalu Venkitapathi, Coimbatore (IN); Jasmine Singh, New Delhi (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 206 days.

(21) Appl. No.: 15/443,529

(22) Filed: Feb. 27, 2017

(65) Prior Publication Data

US 2018/0123909 A1  May 3, 2018

(30) Foreign Application Priority Data

Oct. 28, 2016 (IN) .............................. 201641037158

(51) Int. Cl.
*G06F 15/173* (2006.01)
*H04L 12/24* (2006.01)
(Continued)

(52) U.S. Cl.
CPC ........ *H04L 41/5009* (2013.01); *H04L 43/045* (2013.01); *H04L 43/08* (2013.01); *H04L 43/16* (2013.01); *H04L 67/306* (2013.01)

(58) Field of Classification Search
CPC ... H04L 41/5009; H04L 43/045; H04L 43/08; H04L 43/16; H04L 67/306
(Continued)

(56) References Cited

U.S. PATENT DOCUMENTS 6,738,736 B1  5/2004 Bond
7,103,452 B2  9/2006 Retsina
(Continued)

FOREIGN PATENT DOCUMENTS

JP        2012059074 A  *  3/2012

OTHER PUBLICATIONS

European Search Report EP 17199259.7, dated Dec. 19, 2017, 9 pages.

*Primary Examiner* — Brian Whipple
*Assistant Examiner* — Hannah S Wang
(74) *Attorney, Agent, or Firm* — Cantor Colburn LLP

(57) ABSTRACT

The present disclosure discloses a method and a system for dynamically managing performance indicators for an enterprise to address goals for facility operations management. The method comprises integrating operations data associated with an enterprise, deriving Key Performance Indicators (KPIs), thresholds and metrics, determining factors affecting performance of the KPIs and factors affecting performance of the thresholds, normalizing the factors affecting the performance of the KPIs based on a comparability matrix, assessing performance of KPIs based on the one or more thresholds, the comparability matrix and associated patterns of the normalized data to derive KPI performance insights, fine-tuning the KPIs and enhancing the system, along with the one or more KPIs and the interactive visualization based on one or more patterns of usage of the interactive visualization and the fine-tuning, thereby dynamically managing performance indicators for an enterprise to address the goals of facility operations management.

19 Claims, 5 Drawing Sheets

(51) Int. Cl.
*H04L 12/26* (2006.01)
*H04L 29/08* (2006.01)

(58) Field of Classification Search
USPC .......................................................... 709/224
See application file for complete search history.

(56) References Cited

U.S. PATENT DOCUMENTS

| | | | |
|---|---|---|---|
| 7,219,069 B2 | 5/2007 | Fouquet | |
| 7,957,993 B2 | 6/2011 | MacGregor | |
| 8,055,375 B2 | 11/2011 | Pingel et al. | |
| 8,155,900 B1 * | 4/2012 | Adams | H04L 12/66 |
| | | | 702/62 |
| 8,219,440 B2 | 7/2012 | Bhandari et al. | |
| 8,554,709 B2 | 10/2013 | Goodson et al. | |
| 8,600,556 B2 | 12/2013 | Nesler et al. | |
| 8,676,721 B2 | 3/2014 | Piovesan et al. | |
| 8,683,370 B2 | 3/2014 | Marchand et al. | |
| 9,076,111 B2 | 7/2015 | Delorme et al. | |
| 2010/0023362 A1 | 1/2010 | Nguyen et al. | |
| 2010/0318200 A1 | 12/2010 | Foslien et al. | |
| 2011/0137714 A1 | 6/2011 | Bhandari et al. | |
| 2013/0066687 A1 | 3/2013 | Dewangan | |
| 2013/0173355 A1 | 7/2013 | Barcenas | |
| 2014/0188572 A1 | 7/2014 | Hegde et al. | |
| 2015/0039401 A1 | 2/2015 | Ricketts | |
| 2015/0046251 A1 * | 2/2015 | Smith | G06Q 30/0242 |
| | | | 705/14.41 |
| 2015/0169332 A1 * | 6/2015 | Fisher | G06F 9/441 |
| | | | 707/769 |
| 2016/0034838 A1 | 2/2016 | Gembicki | |
| 2016/0171414 A1 | 6/2016 | Lee | |
| 2016/0189079 A1 | 6/2016 | Gajdzinski et al. | |
| 2016/0189081 A1 | 6/2016 | Gajdzinski et al. | |
| 2016/0328641 A1 | 11/2016 | Alsaud et al. | |
| 2016/0377306 A1 | 12/2016 | Drees et al. | |
| 2017/0163039 A1 | 6/2017 | Schwarz et al. | |
| 2017/0185921 A1 * | 6/2017 | Zhang | G06F 8/60 |
| 2017/0293874 A1 | 10/2017 | Asaf | |
| 2017/0295078 A1 | 10/2017 | Medas et al. | |
| 2017/0309094 A1 * | 10/2017 | Farahat | G06Q 10/06 |
| 2017/0329290 A1 | 11/2017 | Kopp | |
| 2017/0330195 A1 | 11/2017 | Lange et al. | |
| 2018/0047387 A1 * | 2/2018 | Nir | G10L 15/02 |

* cited by examiner

METHOD AND SYSTEM FOR MANAGING PERFORMANCE INDICATORS FOR ADDRESSING GOALS OF ENTERPRISE FACILITY OPERATIONS MANAGEMENT

This application claims the benefit of Indian Patent Application Serial No. 201641037158, filed Oct. 28, 2016, which is hereby incorporated by reference in its entirety.

TECHNICAL FIELD

The present disclosure relates to field of energy management. More particularly but not exclusively, the present disclosure relates to a method and system for managing performance indicators for addressing goals of enterprise facility operations management.

BACKGROUND

The existing energy management systems use performance indicators to manage energy of an enterprise effectively, but do not provide insights on why performances of the performance indicators are low or high at multiple levels like asset, sub-asset, site, building, store, format and enterprise. It is essential for the enterprise to detect, measure, trace and report the exact cause and effect of issue or reason for inefficiency or low/high performance. Also there are multiple types of facilities with respect to end-use of the facility, type of building, type of business it is catering to, operating patterns, and availability of resources to manage the facility, type of customers etc. Along with this, the facilities might be at different locations, which not only changes the weather conditions of the facility, but also the behavioural contexts and usage of facilities. Owing to this diversity, it is a challenge to identify performance indicators, set thresholds, detect deviations/issues and solve/report them in real time or as deemed suitable by the user profile.

SUMMARY

An embodiment of the present disclosure discloses a method of managing performance indicators of an enterprise for energy management. The method comprises integrating operations data associated with an enterprise from one or more sources and an indicator management database, deriving one or more Key Performance Indicators (KPIs), one or more thresholds and one or more metrics based on the integrated data and goals of facility operations management, determining one or more factors affecting performance of the KPIs and one or more factors affecting performance of the one or more thresholds, creating a comparability matrix based on the one or more factors affecting performance of the KPIs and the one or more factors affecting performance of the one or more thresholds to identify clusters of objects, corresponding data points and techniques to be used for normalization of the one or more KPIs, normalizing the one or more KPIs based on at least one factors affecting the performance of the KPIs, at least one of the clusters of objects, the corresponding data points or the techniques for normalization to provide normalized data, assessing performance of KPIs based on the one or more thresholds, the comparability matrix and associated patterns of the normalized data to derive KPI performance insights, providing the one or more KPIs, the KPI performance insights and the one or more factors affecting performance of the KPIs to a user, through an interactive visualization based on user profile, fine-tuning the one or more KPIs based on the performance of KPIs, the one or more thresholds and the one or more metrics through machine-learning techniques and enhancing the auto-learning performance system, along with the one or more KPIs and the interactive visualization based on one or more patterns of usage of the interactive visualization and the fine-tuning, thereby dynamically managing performance indicators for an enterprise to address the goals of facility operations management.

In one embodiment, the present disclosure discloses an energy management system for managing performance indicators for energy management in an enterprise, comprising a processor and a memory communicatively coupled to the processor. Here, the memory stores processor-executable instructions, which, on execution, causes the processor to integrate operations data associated with an enterprise from one or more sources and an indicator management database, derive one or more Key Performance Indicators (KPIs), one or more thresholds and one or more metrics based on the integrated data and goals of facility operations management, determine one or more factors affecting performance of the KPIs and one or more factors affecting performance of the one or more thresholds, create a comparability matrix based on the one or more factors affecting performance of the KPIs and the one or more factors affecting performance of the one or more thresholds to identify clusters of objects, corresponding data points and techniques to be used for normalization of the one or more KPIs, normalize the one or more KPIs based on the one or more factors affecting the performance of the KPIs, at least one of the clusters of objects, the corresponding data points or the techniques for normalization to provide normalized data, assess performance of KPIs based on the one or more thresholds, the comparability matrix and associated patterns of the normalized data to derive KPI performance insights, provide the one or more KPIs, the KPI performance insights and the one or more factors affecting performance of the KPIs to a user, through an interactive visualization based on user profile, fine-tune the one or more KPIs based on the performance of KPIs, the one or more thresholds and the one or more metrics through machine-learning techniques and enhance the auto-learning performance system, along with the one or more KPIs and the interactive visualization based on one or more patterns of usage of the interactive visualization and the fine-tuning, thereby dynamically managing performance indicators for an enterprise to address the goals of facility operations management.

In another embodiment, a non-transitory computer-readable storage medium for managing performance indicators of an enterprise for energy management, which when executed by a computing device, cause the computing device to perform operations including integrating operations data associated with an enterprise from one or more sources and an indicator management database, deriving one or more Key Performance Indicators (KPIs), one or more thresholds and one or more metrics based on the integrated data and goals of facility operations management, determining one or more factors affecting performance of the KPIs and one or more factors affecting performance of the one or more thresholds, creating a comparability matrix based on the one or more factors affecting performance of the KPIs and the one or more factors affecting performance of the one or more thresholds to identify clusters of objects, corresponding data points and techniques to be used for normalization of the one or more KPIs, normalizing the one or more KPIs based on at least one factors affecting the performance of the KPIs, at least one of the clusters of objects, the corresponding data points or the techniques for normalization to provide normalized data, assessing performance of KPIs based on the one or more thresholds, the comparability matrix and associated patterns of the normalized data to derive KPI performance insights, providing the one or more KPIs, the KPI performance insights and the one or more factors affecting performance of the KPIs to a user, through an interactive visualization based on user profile, fine-tuning the one or more KPIs based on the performance of KPIs, the one or more thresholds and the one or more metrics through machine-learning techniques, along with the one or more KPIs and the interactive visualization based on one or more patterns of usage of the interactive visualization and the fine-tuning, thereby dynamically managing performance indicators for an enterprise to address the goals of facility operations management.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
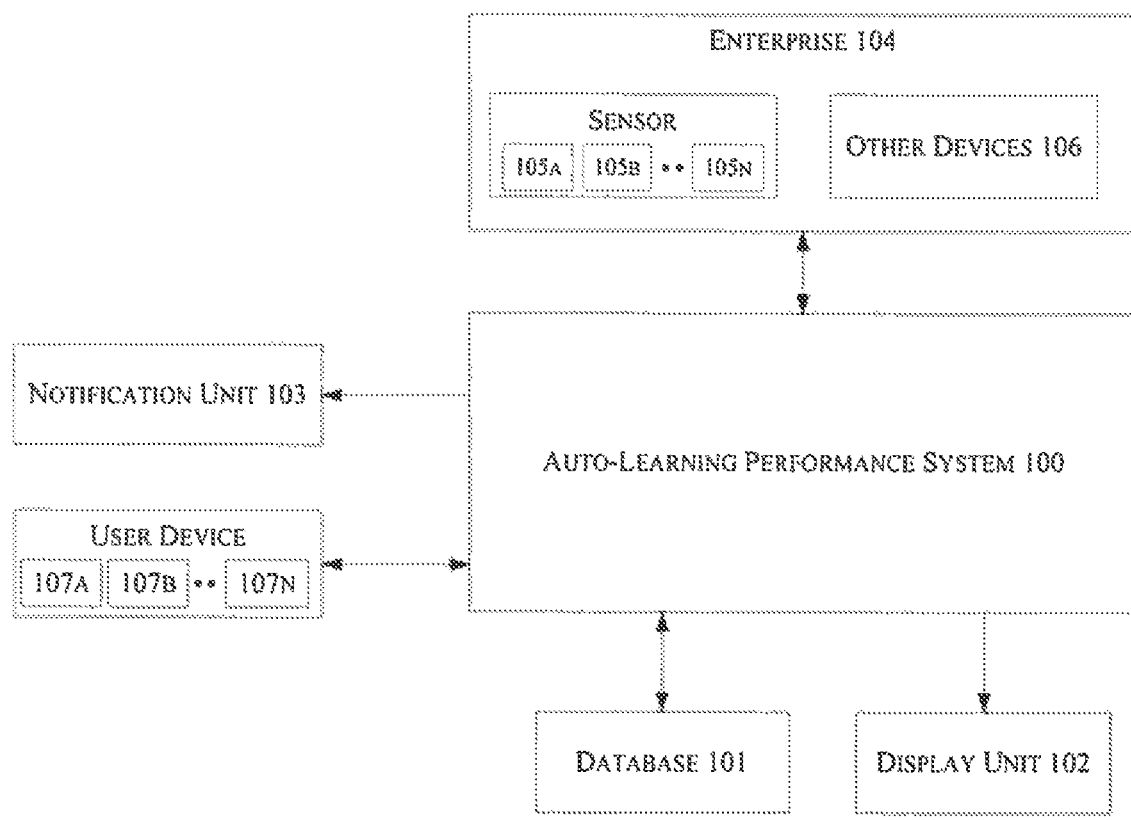
FIG. 1 shows an exemplary environment for dynamically managing performance indicators for an enterprise to address goals of facility management operations in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to an auto-learning performance system for dynamically managing performance indicators for an enterprise to address goals of facility management operations. The auto-learning performance system integrates operation data associated with an enterprise received from one or more sources and an indicator management database. The auto-learning performance system then derives one or more Key Performance Indicators (KPIs), one or more thresholds and one or more metrics. Further, the auto-learning performance system assesses the KPIs and provides insights to a user. Thereafter, the KPIs are fine-tuned and enhanced to dynamically manage performance indicators for an enterprise for addressing the goals of facility operations management.

FIG. 1 shows an environment for dynamically managing performance indicators for an enterprise to address goals of facility operations management. The environment comprises an auto-learning performance system 100, a notification unit 103, an enterprise 104, user device 107A, user device 107B, . . . , user device 107N. The said user devices can be collectively referred to as one or more user devices 107 hereafter in the present disclosure. The environment further comprises a database 101 and a display unit 102.

The auto-learning performance system 100 receives operations data associated with the enterprise 104 from one or more sources. The one or more sources may be one or more sensors 105 (collective representation of sensor 105A, sensor 105B, . . . , sensor 105N), one or more meters, one or more controllers, a Building Management System (BMS) and other devices 106 of the enterprise 104. In an embodiment, the one or more sources may be a part of the enterprise 104 or can be stand-alone systems. Further, the auto-learning performance system 100 derives one or more Key Performance Indicators (KPIs), one or more thresholds and one or more metrics based on the integrated data. Then, the auto-learning performance system 100 determines one or more factors affecting the one or more KPIs and the one or more thresholds. Further, the auto-learning performance system 100 creates a comparability matrix to identify clusters of objects, corresponding data points and techniques to be used for normalization of the one or more KPIs. Furthermore, the auto-learning performance system 100 normalizes the one or more KPIs based on the one or more factors affecting the KPIs. The normalized data is used for comparison. Then, the auto-learning performance system 100 assesses performance of the KPIs based on the one or more thresholds, the comparability matrix and associated patterns of the normalized data. The auto-learning performance system 100 derives performance insights based on the assessment. Then, the auto-learning performance system 100 fine-tunes the one or more KPIs and enhances the performance of the KPIs. Thus, the auto-learning performance system dynamically manages performance indicators for the enterprise 104 to address goals of the facility operations management.

The one or more sensors 105 and the one or more meters may monitor one or more parameters of the enterprise 104. In an embodiment, the one or more parameters may be stored in the database 101. In an embodiment, the database may be a dedicated indicator management database. In an embodiment, the database may be linked to one or more utility system interfaces, one or more vendor system interfaces, one or more web interfaces, an enterprise Management Information System (MIS).

In an embodiment, the auto-learning performance system 100 displays one or more options to a user based on the assessment on the display unit 102. The one or more options may include solutions to problems encountered during assessments. Further, the auto-learning performance system 100 receives at least one input from the one or more user devices 107 for the displayed one or more options. Accordingly, the auto-learning performance system 100 performs an action.

In an embodiment, the auto-learning performance system 100 may use machine learning algorithms to learn the patterns of options for corresponding assessments received from the one or more user devices 107. From the pattern recognized, the auto-learning performance system 100 may perform an action for subsequent assessments. Hence, the performance system 100 is referred as auto-learning performance system 100.

In an embodiment, the auto-learning performance system 100 may notify the user using the notification unit 103 when an alert is generated in the system. The notification may be a visual notification, an audio notification etc.

Figure 2:
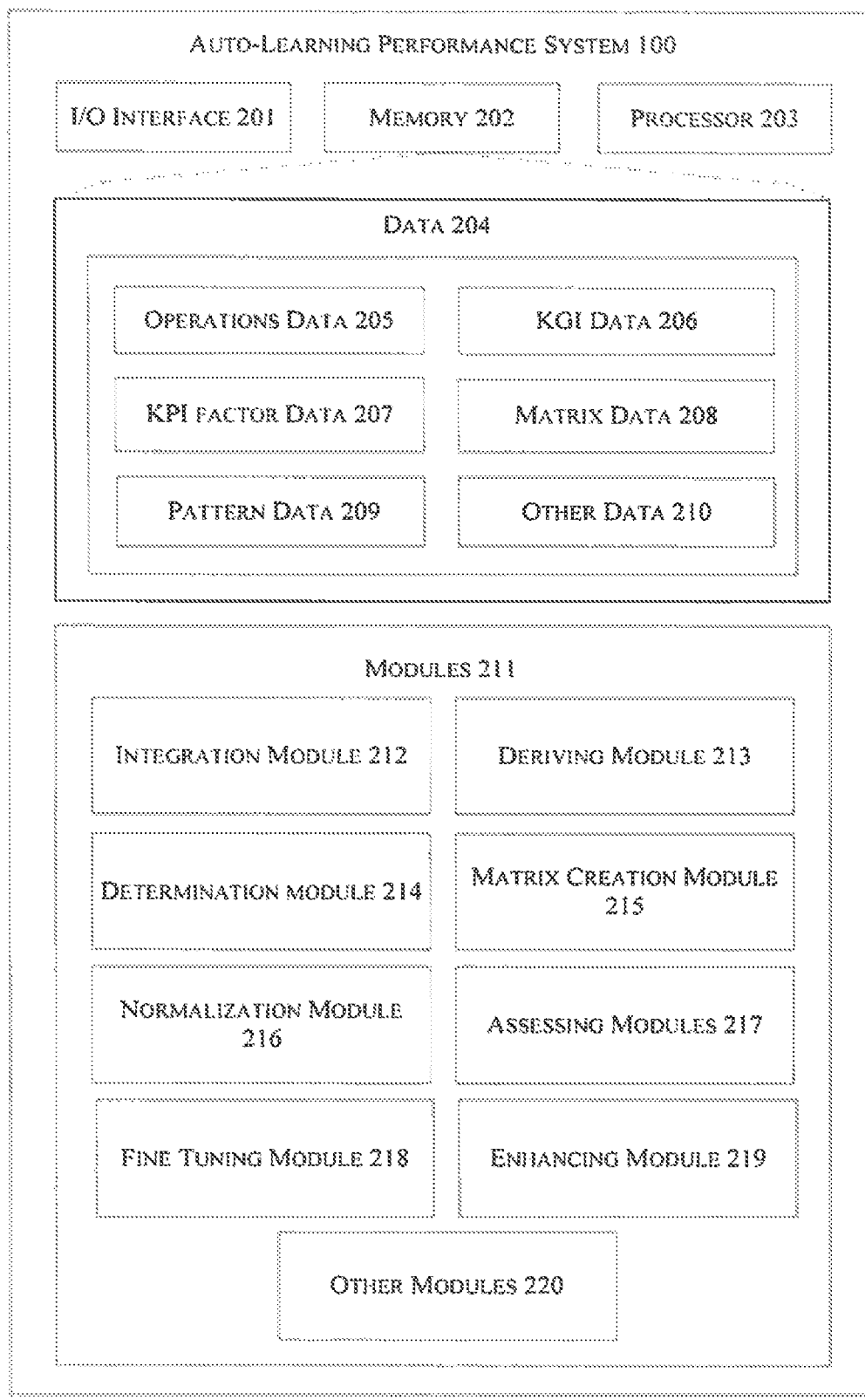
FIG. 2 shows a broad level of internal architecture of an auto-learning performance system for dynamically managing performance indicators for an enterprise to address goals of facility management operations in accordance with some embodiments of the present disclosure.

FIG. 2 shows a broad level internal architecture of the auto-learning performance system 100. The auto-learning performance system 100 may include at least one central processing unit ("CPU" or "processor") 203 and a memory 202 storing instructions executable by the at least one processor 203. The processor 203 may comprise at least one data processor for executing program components for executing user or system-generated requests. A user may include a person, a person using a device such as those included in this disclosure, or such a device itself. The memory 202 is communicatively coupled to the processor 203. In an embodiment, the memory 202 stores one or more data 204. The auto-learning performance system 100 further comprises an Input/Output (I/O) interface 201. The I/O interface 201 is coupled with the processor 203 through which an input signal or/and an output signal is communicated.

In an embodiment, one or more data 204 may be stored within the memory 202. The one or more data 204 may include, for example, operations data 205, Key Goal Indicator (KGI) data 206, KPI factor data 207, Matrix data 208, pattern data 209 and other data 210.

In an embodiment, the operations data 205 may include enterprise type, enterprise requirements, number of sensors, measurement units of devices present in the enterprise, etc.

In an embodiment, the KGI data 206 may include parameters used to help an enterprise 104 define and measure its progress towards achieving its objectives or critical success factors. The parameters are quantifiable measures that can be expressed in either financial or non-financial terms and reflect nature of the enterprise 104.

In an embodiment, the KPI factor data 207 may include temperature, humidity, set-points, static data such as set-points, make and model of assets etc. enterprise 104.

In an embodiment, the matrix data 208 includes normalized values of KPI data, associated one or more factors affecting the KPIs, associated one or more factors affecting the one or more thresholds, etc.

In an embodiment, the pattern data 209 includes individual data points and indicators, combination of data points and indicators, deviations from expected values, patterns of cause, patterns of issue resolution, patterns of use of indicators, outputs of machine learning algorithms etc.

The other data 210 may be used to store data, including temporary data and temporary files, generated by modules 211 for performing various functions of the auto-learning performance system 100.

In an embodiment, the one or more data 204 in the memory 202 is processed by modules 211 of the auto-learning performance system 100. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the modules 211 may include, for example, integration module 212, deriving module 213, determination module 214, matrix creation module 215, normalization module 216, assessing module 217, fine-tuning module 218, enhancing module 219 and other modules 220. It will be appreciated that such aforementioned modules 211 may be represented as a single module or a combination of different modules.

In an embodiment, the integration module 212 integrates operations data 205 associated with the enterprise 104. The operations data 205 is received from one or more sources of the enterprise 104 through a user interface of the auto-learning performance system 100. In an embodiment, the operations data 205 can be stored by a user. The stored operations data can be retrieved from the database 101. In an embodiment, the operations data 205 can be received from the one or more user devices 107. Further, the received operations data 205 is validated, treated and organized. In an embodiment, the validation, treatment and organization of the operations data 205 is performed by a data processor.

In an embodiment, the other devices 106 may be a Personal Data Assistant (PDA), mobile phone, laptop, netbook, or any type of other computing devices.

In an embodiment, the deriving module 213 derives one or more KPIs, one or more threshold and one or more metrics based on the integrated data and goals of facility operations management. The deriving module 213 derives the one or more KPIs based on the goals of the enterprise 104. The goals of the enterprise are defined through KGI data 206. Also, the KPIs are derived based on the operations data 205. Further, the deriving module 213 derives one or more thresholds and metrics corresponding to the one or more KPIs. In an embodiment, the deriving module 213 may comprise a KPI selector to select the one or more KPI's from the database 101.

In an embodiment, the determination module 214 determines one or more factors affecting the one or more KPIs and the one or more thresholds.

In an embodiment, the matrix creation module 215 creates a comparability matrix based on the one or more factors affecting the one or more KPIs and the one or more factors affecting performance of the one or more thresholds. The comparability matrix is created to identify clusters of objects, corresponding data points and techniques to be used for normalization of the one or more KPIs.

In an embodiment, the normalization module 216 normalizes the one or more KPIs based on the factors affecting the one or more KPIs. Also, the normalization module 216 normalizes the one or more thresholds based on the factors affecting performance of the one or more thresholds. The normalization is performed to simplify the process of comparing KPIs and metrics of different units and types across different domains of the enterprise 104. In an embodiment, the normalization module 216 may comprise a dedicated unit for normalizing the one or more thresholds. In an exemplary embodiment, the dedicated unit may be termed as normalizer.

In an embodiment, the assessing module 217 assesses the performance of the one or more KPIs based on the one or more thresholds, the comparability matrix and associated patterns of the normalized data. The assessment is used to derive KPI performance insights. Further, the KPI performance insights are provided to the user through an interactive user interface. Further, the assessing module 217 assesses detected patterns of performance of the one or more KPIs, issue resolutions, deviations and causes, the one or more KPIs usage, etc. Further, the assessing module 217 assesses changes detected in the patterns. Here, historical data is considered for assessing changes in the patterns. Further, future patterns and issues can be forecasted based on the assessment of the patterns and change of patterns of historical data. In an embodiment, the patterns are detected by a pattern detector and change of the patterns are detected by a change detector. Further, the future patterns and issues can be forecasted using a forecaster. In an embodiment, the historical data represents all types of data determined and collected by the auto-learning performance system 100.

In an embodiment, the fine-tuning module 218 fine-tunes the one or more KPIs based on the insights of performance of the KPIs, the one or more thresholds and the one or more metrics. The fine-tuning module 218 may use machine learning techniques to fine-tune the one or more KPIs. The fine-tuning module 218 may comprise a KPI fine-tuner for fine-tuning each of the one or more KPIs. Here, the KPI fine-tuner is a dedicated unit for fine-tuning the one or more KPIs.

In an embodiment, the enhancing module 219 enhances the KPIs based on patterns of usage of the interactive visualization and fine-tuning. Thus, the proposed system dynamically manages performance indicators for the enterprise 104 to address goals of facility operations management.

In an embodiment, the other modules 220 may include a navigation builder, a profiler and an algorithm tuner. The other module 220 may also include any additional modules 211 required to perform functions as described in the present disclosure.

In an embodiment, the navigation builder creates a framework for UI based navigation. The navigation builder helps navigate between each of the framework for choosing the one or more KPIs. In an embodiment, the profiler uses information on type of user profiles and segregates navigation framework and views based on the profiles. In an embodiment, the algorithm tuner fine-tunes algorithms used for dynamically managing performance indicators based on the patterns, changes and issues predicted by the pattern detector, the change detector and the forecaster.

Figure 3:
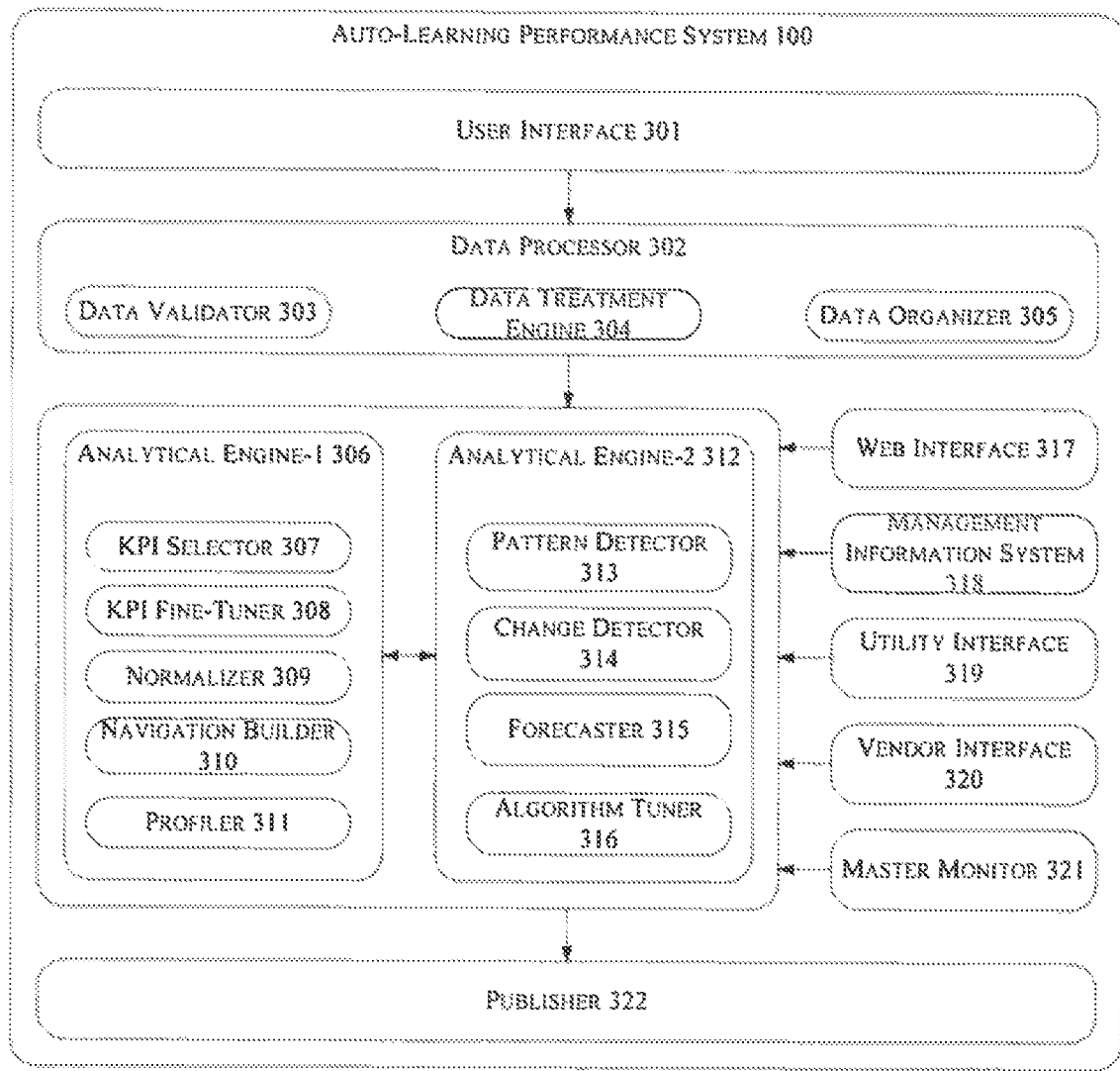
FIG. 3 shows a detailed block diagram of internal architecture of the auto-learning performance system for dynamically managing performance indicators for an enterprise to address goals of facility management operations in accordance with some embodiments of the present disclosure.

FIG. 3 shows a detailed block diagram of internal architecture of the auto-learning performance system 100. User Interface 301 is a layer where the user can provide his inputs before the operations data 205 gets analyzed. The user interface 301 provides flexibility to the user to input all of the operations data 205. The auto-learning performance system 100 automatically classifies information and uses it when necessary. The users can describe the operations data 205 that they receive/expect from the one or more sensors 105 and other devices 106. The operations data 205 can be described under various heads: source of data (internal/external), frequency of data received, static/dynamic data point, etc. The user is given flexibility to add additional data points at any time. The auto-learning performance system 100 automatically classifies and accommodates the operations data 205 into indicators. The auto-learning performance 100 can also use information provided to get access to information available on web. For example, the auto-learning performance system 100 can pick up address of a facility and get details on dimensions of the building through map services. The auto-learning performance system 100 can also determine whether the building is a shared building or an individual building. Similarly, the auto-learning performance system 100 may be able to receive and collate information from the enterprise website on schedules, types of products etc. On a regular basis, the auto-learning performance system 100 can track offers, sales, change of services and use the information whenever required. The auto-learning performance system 100 provides the option to the user for providing goals for developing KPIs. The auto-learning performance system 100 can either receive a specific input based on need or as a choice from default options provided for different types of establishment/facilities.

Data processor 302 is the second layer and comes next to the user interface 301 layer. The data processor 302 is a part of the integration module 212. The data processor 302 performs various functions including, but not limited to, data validation, data treatment and data organization, which takes place in different modules such as data validator 303, data treatment engine 304 and data organizer 305.

Data Validator 303 validates the operations data 205 based on ranges, checks for missing, duplicate and invalid samples. Data treatment engine 304 treats the operations data 205 issues identified in the previous layer and data organizer 305 aligns and groups the operations data 205 for easy application of algorithms.

Analytical engine-1 306 receives the operations data 205 from the data organizer 305. The analytical engine-1 306 comprises one or more modules, KPI selector 307, KPI fine-tuner 308, normalizer 309, profiler 311 and navigation builder 310.

KPI selector 307 is the first module of the analytics engine-1 306. Based on the operations data 205, the KPI selector 307 identifies goals of the user (Key Goal Indicators), prioritizes the KGIs and then maps the indicators (KPIs) to the KGIs. The KPI Selector 307 is a dedicated unit of the deriving module 213. The KPI selector 307 selects the one or more KPIs from the database 101.

KPI fine-tuner 308 is the second module of the data processor 302 layer. The KPI fine-tuner 308 identifies the metrics, identifies calculation algorithm for each metric, determines thresholds and fine-tune the thresholds based on operations data 205 and feedback from the output of algorithms from Analytics Engine 2 312. The KPI fine-tuner 308 forms a part of the fine-tuning module 218.

The normalizer 309 receives the KPI factor data 207 and the one or more factors affecting the one or more thresholds. In an embodiment, the normalizer 309 is configured in the normalization module 216 of the auto-learning performance system 100. While industry standards are available to identify efficient and inefficient systems, there are certain processes inherent to the systems which are unknown. The processes may make the system efficient or inefficient. However, to identify such processes comparison of the 'objects' has to be performed. 'Object' here may refer to any system/sub-system whose performance can be quantified. To be able to compare such objects, the technique of normalization is used, which is a process wherein data is treated so that it can be used for comparison across different dimensions.

Navigation builder 310 is the fourth module of the analytical engine-1 306 layer. After the one or more KPIs have been identified and mapped to possible causes, the navigation builder 310 performs the task of creating a framework for UI based navigation. It provides flexibility to the user to navigate through different KPIs. The idea behind the navigation is to give critical information and possible causes in the beginning, but the choice of which aspect to be attacked/validated is left to the user. The purpose of navigation is to use and leverage human experience in identifying issues. Hence, the auto-learning performance system 100 learns each time the user navigates. The user can also flag an event when the event is critical, so that similar events can be reported hence forth. A follow up loop may also be generated for the event identified, to track improvement or resolution. An event created in one place can also be used to monitor/implement findings for another place/object with similar characteristics.

The profiler 311 uses information on type of user profiles and segregates navigation framework and views based on those profiles. For example, site level technicians would want to look at only a particular site' details, however an energy manager might be interested in group of stores and energy director might be interested to look at complete enterprise performance. While some views can be restricted for some profiles, view options can be made available based on hierarchy. Profiler 311 results are then published for the user to view the results.

In an embodiment, the publisher 322 publishes the results processed by the data processor 302. The results may be made available through various modes such as reports, a web portal, mobile applications or through real time on-site monitoring screens. Alarms may be separately enabled to alert the users when a particular indicator crosses designated limits or thresholds. Apart from indicator profile, the publisher 322 also enables the user to see the impact of the problem and provides the user with multiple options to resolve the issue. The resolutions are provided with weightage and time of expected time of resolution and appropriate costs and benefits associated to each. Notifications are provided to the to in-store teams and may be correlated with vendor site visits to improve resolution time The publisher 322 may also take up data on technician availability (based on skills, locations, rate and immediate availability), spares/parts/consumables ability from maintenance database to help the user identify best possible resolution. The publisher 322 may also indicate that similar issues had occurred with the same object or near-by object to highlight the broader issue. The publisher 322 gives options to the user to modify the views based on need. Different views can be enabled based on location (enabled by GPS tracking), time of access (time of day, day of week, day of the month etc.) or type of device being used by the user to view the one or more KPIs. It also enables the user to see historical trends and patterns of a KPI and correlate it with other KPIs, other objects etc. Based on the pattern created by the user, publisher 322 automatically highlights areas with potential issues. Further options are provided to the user for viewing historical trends classified by different factors and combinations like periodicity (hourly, daily, weekly, monthly etc.), by type of day (Sun, Mon, etc.) by date (1-31), seasonality, festive days, promotions etc. So a report can be generated for 13:00 hours for each Sunday of month and so on. The patterns identified by pattern detector 313 of Analytics Engine-2 312 can also be used to view objects with similar/dissimilar patterns. Access can also be provided to users to monitor maintenance activities and schedule work according to the facility and operator's schedule. It can also enable the user to access information about issues so that activities can be planned in advance.

Analytical engine-2 312 works along with the analytical engine 1 306 to manage the one or more KPIs of the enterprise 104. The primary objective of analytical engine-2 312 is to run algorithms to identify causes of issues, patterns, changes and forecast events to dynamically adapt the indicators to different situations. The analytical engine-2 312 uses dynamic adapting process for maintaining diagnostic efficiency and continuous improvement.

The framework for maintaining diagnostic efficiency is enabled to capture and learn from diagnostic experience and capabilities of human interface. Flexibility is provided to the user to navigate through bunch of indicators to identify problems and system learns through the navigation style and approach for future diagnosis.

In an embodiment, the present disclosure continuously improves efficiency of the auto-learning performance system 100. In any system of the enterprise 104, either inefficiencies can creep into the system or the system can become efficient over a period of time (which could be due to exhaustion of resolutions possible by given indicators). In both cases, the one or more KPIs used should remain relevant. Hence primary objective of the continuous improvement framework is to adapt/improve over time to incorporate the changes. The said objectives are achieved through one or more modules namely pattern detector 313, change detector 314, forecaster 315 and algorithm tuner 316.

Pattern detector 313 is the first module of analytical engine-2 312. Patterns are repetitive occurrence of events/conditions usually in a sequence. There can be multiple combinations of logics that lead to a particular pattern. Patterns are observed for operations, indicator performances etc. Patterns identification is not only for identifying issues for inefficient objects but also for identifying factors behind efficient working of objects. This gives insight on what causes efficiency and can be replicated for inefficient systems. Any unexplainable change in pattern is highlighted and notified to the user. The objects can also be compared and grouped based on patterns and made available to the users by the publisher 322. A pattern change can be both in quantum and order of occurrence and can differ based on multiple factors, which are identified through multiple iterations in this process.

The change detector 314 is used to analyze changes in the patterns detected by the pattern detector 313. A change in this context refers to a one-time change of state that occurs in a system/object, post which the pattern changes till the time another such change occurs. Change detector 314 identifies probable reasons of a change, like if there are manual interventions or infrastructure based deviations (health of the site) or changes have been done at site/infrastructure or an asset has been replaced etc.

The forecaster 315 predicts occurrence of events/deviations based on historical data by running forecasting algorithms. Further, the forecaster 315 proactively informs forecast results to the user. For example, the forecaster 315 predicts when an asset will face an issue based on current operating situation and historical information on faults committed by the asset, thereby helping prevent maintenance or input to alternate arrangements.

The algorithm tuner 316 changes thresholds, fine-tunes algorithms used in the analytical engine-2 312 based on the patterns, changes and issues predicted by the pattern detector 313, change detector 314 and forecaster 315.

In an embodiment, results of the pattern detector 313, the change detector 314 and the forecaster 315 are assessed by the assessing module 217. Based on the assessment, the algorithm tuner 316 fine-tunes the algorithm.

Figure 4:
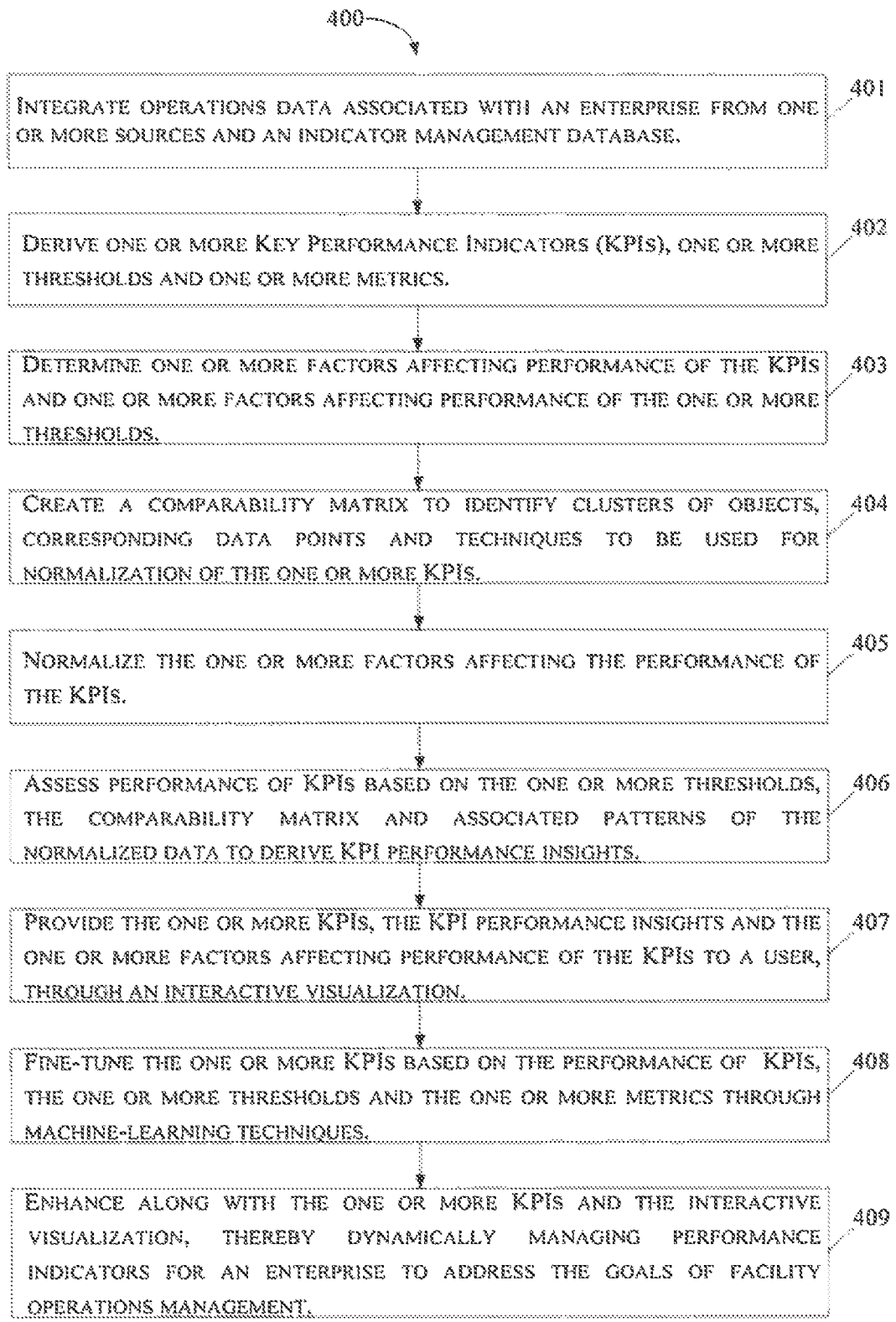
FIG. 4 shows a flow chart illustrating a method for dynamically managing performance indicators for an enterprise to address goals of facility management operations in accordance with some embodiments of the present disclosure.

FIG. 4 shows a flowchart illustrating a method of dynamically managing performance indicators for an enterprise to address goals of facility operations management in accordance with some embodiments of the present disclosure.

As illustrated in FIG. 4, the method 400 may comprise one or more steps for dynamically managing performance indicators for an enterprise to address goals of facility operations management. The method 400 may be described in the general context of computer executable instructions. Generally, computer executable instructions can include routines, programs, objects, components, data structures, procedures, modules, and functions, which perform particular functions or implement particular abstract data types.

At step 401, the integration module 212 integrates operations data 205 associated with the enterprise 104 from one or more sources and an indicator management database 101.

At step 402, the deriving module 213 derives one or more KPIs, one or more thresholds and one or more metrics.

At step 403, determination module 214 determines one or more factors affecting the one or more KPIs and one or more factors affecting performance of the one or more thresholds.

At step 404, the matrix creation module 215 creates a comparability matrix to identify cluster of objects, corresponding data points and techniques to be used for normalization of one or more KPIs.

At step 405, the normalization module 216 normalizes the one or more KPIs based on factors affecting the one or more KPIs, at least one of clusters of objects, corresponding data points, and the techniques used for normalizing.

At step 406, the assessing module 217 assesses performance of the one or more KPIs based on the one or more thresholds, the comparability matrix and associated patterns of the normalized data to derive KPI performance insights.

At step 407, the assessing module 217 provides the derived KPI performance insights to the user through an interactive user interface.

At step 408, the fine-tuning module 218 fine-tunes the one or more KPIs based on performance of the one or more thresholds and the one or more metrics.

At step 409, the enhancing module 219 enhances the one or more KPIs for dynamically managing performance indicators for the enterprise 104 to address facility operations management.

The detailed description of the method steps are described herein:

Deriving one or more KPIs based on the operations data 205—Once the operations data 205 is fed into the auto-learning performance system 100 through the user interface 301 and is organized in the data processor 302, operations data 205 processing is performed in three steps, namely data validation, data treatment and data organization.

Data validation is performed for both interval data and static data. In an embodiment, the validation comprises checking number of data points received for each site and each asset, range of values received, checking for duplicate samples and missing data detection.

In an embodiment, the auto-learning performance system 100 identifies data samples within a range based on at least one of fixed ranges based on each data type, facility type, operations, dimensions, locations etc. The ranges can further vary for each system/sub-system/service based on the policies/services/end use they are utilized for. Further, different statistical methods (distance based, depth based, deviation based, density based, etc) may be used for detecting outliers Validation is also done based on comparison with historical data, peer store (similar in characteristics), another data point (correlation/association based pattern analysis-(comparing consumption with run hours, consumption with temperature etc.). Pattern based detection can be also used to validate variation in data point values over a period of time. For example, sensor values cannot be constant for a long duration, so fluctuation and type of fluctuation in sensor data values may indicate communication errors, sensor health etc. Furthermore, validation of static data points like area (covered/uncovered), dimensions, services, schedule, presence of skylights, building material, windows, insulation, presence of heat proof painting etc. may be done through web resources.

In an embodiment, a duplicate sample would be identified using a time stamp. While those samples which have same timestamp and same value can be easily removed, but sometimes two samples have same timestamp, with different value. In such case, the value closer to the acceptable/possible range is identified. Additional samples are moved to the database 101.

In an embodiment, the missing data detection takes place at two levels. First, detection of missing samples/data points from raw data is performed. Secondly, unavailability of supporting data like schedule, services offered, building/facility specifications etc. is performed. Supporting data points are recovered from external sources available on the web. For example, dimensions can be estimated from the map service, services and type of operations can be collected from enterprise website etc. Logs of missing data are also sent to the database 101, which is further used to identify possible causes of missing data based on patterns such as intermittently missing, continuous missing etc.

Based on the validation results, the auto-learning performance system 100 determines whether the data point or sample can be treated or replaced in case of missing data. Multiple treatment approaches can be used based on type of issue. When samples are missing for data points, algorithms are capable to derive the values based on inputs/data points received for other parameters. Relationships and coefficients are built and refined for each building/site/system based on performance and history of data samples over a period of time. All treated data is flagged, and made available to the user during the analysis. Logs are maintained for both treated and untreated data which are stored in the database.

Based on availability of the data, the data is then organized into useful sets and combinations, so that the speed of algorithm processing is faster each time. The auto-learning performance system 100 has certain fixed modules like aligning instrumentation data by asset, by time, by service and by facility and merging this data with static information like schedule and set points, external sources of data like weather, etc. Data organization is also an ongoing process and based on request from other modules 220, the auto-learning performance system 100 may realign the data based on need. The data organization technique focuses on minimum use of treated data. For example, if few days of consumption (kWh) is missing in a month, to calculate monthly consumption, the auto-learning performance system 100 uses first and the last value of the month, instead of aggregating days' consumption. It also avoids using treated data while processing critical outputs, which means that it avoids taking a decision based on treated data. After the data is organized and the data points available are known, the next step is to select the KPIs. The selection step takes place in KPI selector 307 of the Analytics Engine-1 306 layer.

In an embodiment, the present disclosure discloses a method for selecting Key Goal Indicators (KGIs). KGIs are basically what the enterprise 104 wants to achieve through the auto learning performance system for example, comfort or energy efficiency or cost. KGIs are usually provided by the enterprise 104, while default options are also available based on each establishment and building data imaging developed based on inputs received. The enterprise 104 may opt for achieving one or more goals as may be necessary. If there is more than one goal, a priority has to be given to the goals, so that in case there is a conflict, precedence can be given to the goal which is high on priority.

In an embodiment, the present disclosure discloses a method for selecting KPI. Once the KGIs have been identified, suitable one or more KPIs are selected from the database 101 which is a comprehensive database developed for all kinds KGIs. In an embodiment, a dedicated database 101 may be used for storing the one or more KPIs. The dedicated databased may be termed as KPI database 101. The KPI database 101 classifies the one or more KPIs based on KGI, establishment type, type of use, services, products offered, etc. The selection of one or more KPIs is further based on the information indicating feasibility of use such as control details, types of controllers available etc. The KPI selection process is not repetitive and occurs only the first time the data is fed into the system, however if the algorithm detects addition/deletion of a new data point or dimension, the related KPI is automatically adjusted, added or deleted. Also, in case the enterprise 104 is interested in a specific indicator, though the specific indicator may not be part of selected KPIs, a provision can be made to add the specific indicator to the list. Further, the KPI database 101 is regularly updated.

The KPI selection is based on enterprise specifications which further include infrastructure details like building dimensions, building architecture, floor plan etc. The enterprise specification further comprises static details on make and model, capacity, installation details etc for assets, sub-assets, meters, sensors etc, operational details like types of services, store formats and type of operations, types of user behaviour which helps in determining the level at which a KPI is calculated.

In an embodiment, the present disclosure discloses a method for classifying the one or more KPIs. Based on goals and data availability the one or more KPIs are classified as asset versus process indicators and event versus problem indicators. Asset indicators depict the health of an asset e.g., EER (energy efficiency ratio), COP (Coefficient of performance) for HVAC assets. Process indicators give overview of performance of the system. For example, HVAC/IT load ratio indicates what amount of tonnage of refrigeration is being used to cool down one unit of business or IT load, thus indicating efficiency of the cooling process in entirety. Indicators might also be selected based on other sources of data availability like from the utility interface, vendor interface etc. Utility interface provides on locations and utility presence, tariff structures and plans being used by the facility. These data points are used to give useful indicators on facility performance in relation to the utility. For example, it may indicate performance or aptness of a tariff plan that is currently operational. Vendor interface can provide data on maintenance history or current maintenance data. Vendor performance indicators not only help in understanding the historical issues, but can also help in assessing performance of the vendor in respect to solving a particular issue etc.

Fine tuning indicators is based on multiple factors and is an ongoing process. Once the one or more KPIs are selected, based on availability of data points, metrics and thresholds have to be selected for each of the one or more KPIs. Fine-tuning occurs in the KPI fine-tuner 308. Fine-tuning comprises selection of metrics, determination of impact interval, determination of thresholds and their initial fine-tuning and feedback fine-tuning.

In an embodiment, the present disclosure discloses a method for selecting metrics. Based on enterprise specifications, the metrics are chosen from a Metric database. If the data point required for calculation is not available, then alternate metrics are chosen, which require different data points. The algorithm for calculation of each metric is also defined at this stage and is based on data availability (direct data inputs, derived data inputs), systems/infrastructures in place type of services, products and end use of the establishment.

In an embodiment, the present disclosure discloses a method for determining impact interval. Based on the historical data available, patterns are analyzed to determine the frequency and time interval for which a particular KPI would be aggregated. However subject to user need, this aggregation can be modified. Impact interval ensures that neither the KPI being calculated is too late to indicate a problem nor it is so frequent that it loses out on information.

In an embodiment, the present disclosure discloses a method for determining threshold. Threshold is defined at multiple levels for a wide organization with foot prints at multi state, country, continent level. Threshold is identified (default) for each establishment/facility (based on size, nature of use, building data imaging). Further an option is given to the user to prioritize based on industry benchmark, or intra enterprise benchmark at various levels (country, state, county etc.). In an embodiment, the industry benchmark and intra enterprise benchmark is stored in the database 101. Further, historical data is used to determine patterns for each indicator and appropriate tuning is performed of the one or more thresholds. In an embodiment, one or more threshold could affect performance of the one or more KPIs. The one or more thresholds are applied at asset/system/process/establishment/cluster/region levels for factors including performance, cost, reliability, availability, capacity, maintenance effectiveness, comfort conditions and agility of system/infrastructure response. The one or more thresholds enable users to compare asset/system/process level performance within a facility or with facilities of similar characteristics. The one or more threshold also has a facility to define multi-level thresholds for either a single metric/KPI or a group of metrics/KPI's or a combination of metric and KPI. Thus determination of the one or more thresholds provides flexibility for users of different functions and hierarchical level to choose their requirement on certain conditions of repeatability and intensity. The one or more thresholds are enabled with the matrix severity and urgency to trigger appropriate alerts.

In an embodiment, the present disclosure discloses a method for performing initial fine-tuning. Fine tuning is performed based on data from other sources like weather data, utility data, Management Information System (MIS) data and information from the enterprise 104.

Further the fine tuning can be done based on the utility data. The enterprise may have opted for a particular utility plan or energy program. For example, if the enterprise has opted for a demand response program, then during Demand Response program, separate thresholds will be used as required or suggested by the utility. Further, MIS Data may be used to fine tune. Integration with MIS data provides information on organizational changes, operators in place, change in services offered, changes in instrumentation, systems, design, promotional activities etc. Hence when a deviation happens due to known reasons, the one or more thresholds for that period are dynamically adjusted.

In an embodiment, information from the enterprise 104 are retrieved to correlate with the outcome generated from the KPI fine-tuner 308 to observe relationships that are coherent or data that form as a cause of any variations observed in the analysis outcome. Based on the type of correlation and relationship, results are then fine-tuned by the algorithms.

In an embodiment, the present disclosure discloses a method for performing feedback fine-tuning. As reporting of results begin, the one or more thresholds dynamically adjust themselves based on current patterns. For example, if the enterprise 104 performance is low then thresholds identified for each KPI attack/report the critical aspects first. As the enterprise 104 reaches equilibrium and moves towards efficiency, the one or more thresholds adjust themselves to at-the-moment critical aspect.

In an embodiment, the present disclosure discloses a method for normalizing indicators for relative comparison. The normalization of indicators is performed for enabling relative comparison with similar indicators across the enterprise 104. This step occurs in the normalizer 309. Normalization is a complex process and involves defining objective of normalization, grouping factors for each objective, creating comparability matrix, normalizing data and dynamic feedback based normalization.

Defining objective of normalization involves determining what needs to be compared and why it needs to be compared. The objectives are critical and are aligned based on overall goals (KGI). The objective is defined for each of the indicator applying to one or more objects.

In an embodiment, the present disclosure discloses a method for grouping factors for each objective. Once the indicators and the objects applied by the indicators are determined, factors or characteristics of the object that would influence the indicators are determined, for example, comparison across service areas, assets with similar load conditions etc. There are two kinds of factors, numeric and non-numeric. Based on the type of factor, there are numerous ways in which the factors can be identified and validated. Broadly, method of identification and validation involves detecting and measuring the impact of each factor on performance. This is either achieved through statistical measures like regression, factor analysis, clustering, and pattern identification or through a practical approach like Design of Experiment (DOE). Both supervised and unsupervised learning approaches are followed to improve efficiency of the auto-learning performance system 100.

In an embodiment, the present disclosure discloses a method for creating comparability matrix. Once the factors and their impact is established, groups of KPI objects-factor combinations are converted into a comparability matrix, which states that if two objects have to be compared for a particular indicator, which factor needs to be normalized. Each KPI-object group is referred to as a cluster. Once the comparability matrix is built, the data is normalized for each of the cluster based on the impact. Further, based on the results of the KPI performance from the pattern detector 313, the comparability matrix gets updated and improvised on a regular basis thus enabling dynamic feedback based normalization. New factors are added or deleted as and when identified. Impact calculation is also dynamically updated.

Build navigation framework from KGI to cause occurs in the navigation builder 310. The process works on two levels, first the navigation builder 310 builds the backend navigation framework and then the navigation builder 310 prepares the front end navigation.

In an embodiment the auto-learning performance system 100 builds backend navigation based on selected KPIs from KPI selector 307, metrics, the one or more thresholds and aggregation frequency data from KPI fine tuner normalized data and comparability matrix from normalizer 309, operations data 205 from data organizer 305 and utility, vendor, weather and MIS data.

The building backend navigation further comprises identifying probable cause of an issue and its possible solutions based on patterns of correlation of the data points. Based on the causes and solutions determined, impact is also calculated, to enable KPI prioritization in the front end. Further, a sequence of data points is built to enable drill down in the front end. Feedback from pattern detector 313 is dynamically incorporated and changes are made.

Building front end navigation defines the GUI or the user interface 301. Based on indicator type, interface provides user with two kinds of navigation drill down options. width-navigation drill down and depth-navigation drill down. Width-navigation enables the user to pick one or more KPI that is deviating or being analyzed, and figure out where the problem has occurred, how many facilities have got affected, how many assets got affected etc. This view is enabled through. The auto-learning performance system 100 by taking up data from comparability matrix to differentiate similar and dissimilar types of objects, and using the data to show KPI across similar objects across enterprise, thus enabling width navigation drill down Depth-navigation enables user to user to pick one or more KPI that is deviating or being analysed and look at which are the areas of impact, what has caused it, is it repeat issue or first time etc. Depth navigation drill down is enabled through KPI-metric cause identified at the back end level.

The drill down is made available up-to basic unit used for calculating KPI. The navigation also enables user to look at what future page entails. For example, if a user selects a particular object having deviation in KGI—if the user moves the cursor over page, the front end navigation displays the KPI value because of which it is high and by how much the deviation is. Similarly, if the KPI is deviating, the front end navigation displays the metric responsible and by how much so that without further drilling down, user can make a decision to dig into it or not.

In an embodiment, user interface 301 is provided with a feature called indicator picker which is enabled for the user at each navigation page/view. The user can pick up indicators and values for each view and drag them into the indicator picker. Each time an indicator is picked, the indicator can be viewed in a flowchart. The purpose is to enable user to view full navigation path and make useful decisions by getting a whole view.

In an embodiment, user interface 301 is provided with a feature called cart, which enables user to download the data in both raw and processed format the view at each level. The output may be created in such a format that the output can be directly used for presentations, and actions perspective.

In an embodiment, user interface 301 is provided with a feature called flag, which enables the user to flag an event which is critical and when each time a similar event occurs, such events can be reported. A follow up loop can also be generated for the event identified, to track its improvement/resolution. Further, an event created in one place can also be used to monitor/implement findings for another place/object with similar characteristics.

All the above features are enabled though different views as defined below. The views shown for the first time are selected and optimized for best possible understanding. However, the user can change the view, type (bar, scatter, line etc), orientation, colours, names of the headers etc. At any point, user may be able to save the view for future purposes.

In an embodiment, user interface 301 is provided with an Object view which is the overall view that is enabled for each type of object (site, service, asset and sub-asset). While navigating, a user is shown similar objects. Here, similar objects may be derived by operation or by characteristics of the object-to be determined (identified for comparing). At any stage of the navigation, a user can also replicate similar view for a different object.

In an embodiment, user interface 301 is provided with a timeline view—which enables the user to replicate similar view at a different point in time. a user can Further, user interface is provided with a comparative View which highlights differences in the views created by the user and thus helps in quicker analysis.

In an embodiment, user interface 301 is provided with a flowchart view. A log on flow of navigation/drill down is maintained while the user accesses the portal. A flowchart gets created as and when the user moves ahead. At every stage, flowchart view highlights paths followed by the user and paths denied by the user. At any point in time, the user can go to the flowchart view to navigate to options the user previously didn't navigate to. The flow chart only shows the drill down to the lowest level the user has accessed till then. The end of a navigation path also shows probable solutions, with weightage given to each solution along with cost and benefit. The flowchart view can be saved and directly referred any time the user logs in. The flowchart view shows the most probable cause of deviation based on data available, but does not restrict the user to look at other data points for correlation.

In an embodiment, the present disclosure discloses a method for receiving dynamic feedback. The usage pattern, preferences, options exercised by the user and drills downs made by the user, are logged by master monitor 321 and analyzed in the pattern detector 313. Master Monitor 321 also logs user locations based on GPS. Based on the patterns, the auto-learning performance system 100 learns and enhances the navigation flow.

In an embodiment, the auto-learning performance system 100 categorizes indicators based on profile of users once the navigation flow has been built. Based on the users, users' profile, preferences and type of decision the users can take, the KGI to cause flow is given priority. Based on this priority, each user is given access. Based on the hierarchy of the users, a user higher in hierarchy is given an option to shift to a view for a user lower in the hierarchy and not vice versa. The views generated can also be shared using the same platform, with another user based on permissions granted at each level. A master view is also maintained which logs the use by each user, the type of use, the time of use etc. This enables to correlate impact of using indicators at the ground level. If a user is not using the KPIs and an indicator has crossed critical threshold, SMS/mail alert is sent to the user for that indicator. Vendor notification on alerts specific to make/model/asset/recent activities is carried out at site/asset. Across users, the trend of navigation is also logged to understand type of issues, areas that concern different type of users, locations, domain etc., so that improvisations can be done.

In an embodiment, publishing results of indicators is performed by the publisher 322. This step enables the views created in the previous steps to be published. The method of publishing the indicators comprises calculation of KPIs, application of the one or more thresholds, analysis of trends and patterns assess correlations and relationships between data, using supplement data to validate and improvise on results, developing insights, populating and enabling navigation framework, publishing dashboard web and mobile and publishing screens.

In an embodiment, the present disclosure discloses a method for calculating KPIs. Based on the algorithm for calculation of each metric, the metrics are calculated. Based on metrics outcome, the KPI's algorithm is activated which dynamically maps the KPI identified and weightage mechanism is used for the list of metrics that are available for the specific KPI.

In an embodiment, the one or more thresholds identified in the KPI fine tuner 308 is enabled with the matrix of severity and urgency to trigger appropriate alerts. Based on inputs from KPI fine tuner 308, the one or more thresholds get adjusted through self-learning mode, so as to stay relevant with changing performance of systems/facilities/policies adapted etc.

In an embodiment, the trends and patterns identified in the pattern detector 313, change detector 314 and forecaster 315 are analysed using machine learning algorithms. While trends and patterns for each asset/system/facility are calculated in a separate module, the publisher 322 receives their input and uses them along with the present input where the one or more thresholds are applied. In combination with past trends on performance, the present performance is compared to arrive at KPI performance insights which tells about the effectiveness of KPIs, KGIs and the metrics. The output is used to derive the insights based on present requirement of the facility as compared to its performance.

In an embodiment, the pattern data 209 is used to assess correlations and relationships between data. While trends of the analysis outcome are displayed to provide performance insights on effectiveness of KPIs, it is imperative that on occasions users need additional information which is not pre-defined but regarded of use based on the time of day/ analysis or scenario based. Apart from the outcome generated from the Pattern detector 313, Change detector 314 and Forecaster 315 module, flexibility is provided to add specific objects from basket through the data picker module. Also, flexibility is provided to compare user information along with all existing outputs or with specific outputs through selection process, with options of changing the view of graphs to highlight/observe the impact/variations.

In an embodiment, supplementing data is used to validate and improvise on results—Some of the modules which are interfaced and comprehended are MIS system (citing organizational changes, operators in place, change in services offered, changes in instrumentation, systems, design, promotional activities etc.), weather data, vendor management system, utility interface. Information from these systems are retrieved to correlate with the outcome generated from the previous module to observe relationships that are coherent or data that form as a cause of any variations observed in the analysis outcome. Based on the type of correlation and relationship, the results are then fine-tuned by the algorithms. The KPI fine tuner 308 incorporates any such changes in the initial as well as feedback stage of defining the metric and adjusting the one or more thresholds. Also, the user is enabled to access past history/trends that form a role in again revisiting them through self-learning process.

In an embodiment, the present disclosure discloses a method for developing insights. Developing insights helps generate key outcomes for the given facility/enterprise in conjunction with frequency of outcome and the KGI's that are specified for the enterprise. Further, the outcomes are generated at all levels irrespective of user profiles that are required. The algorithms relate the output of trends, one or more thresholds and the KPI's to generate inferential outputs (including explanation in text language) along with the possible reasons which lead to the positive or negative deviations. Complete traceability of insights from KGI to the object level is built, along with comparative elements based on inputs from the normalizer 309. Output provides enriched outcome to better relate the results.

In an embodiment, the present disclosure discloses a method for populating (generating) and enabling navigation framework. Outcome from Analytical Engine 2 312 are fed as input to the navigation builder 310. Multiple layers are enabled based on the level of KGI's (default/chosen), hierarchical level of organization (country, state, county etc.). The multiple layers along with other factors of number of user profiles from the profiler 311, master monitor 321 are considered while the top down approach is getting built from outcome of KGI to cause to possible solutions. The navigation framework provides flexibility based on different organizational systems, by providing interface to vendors, other systems within the enterprise.

In an embodiment, the present disclosure discloses a method for publishing dash board web and mobile. Standard dashboards are published for identified list of KGI's and associated KPI's along with metrics linked to each of the KPI's. If the list of KGI, KPI is not defined, default list is displayed based on establishment type. Dashboard views are customizable based on user profile—hierarchical (enterprise view to facility view to specific systems, processes, assets), type of function (financial, performance, availability etc.), level of technical depth required (type of faults and related causes). For mobile users, options are available to display results based on the location of the user to provide insights of the specific facility and service area the user is present, which is enabled through master monitor 321. Publish dash board web and mobile framework also provides option to compare the buildings/facilities the user has visited recently or nearby facilities/buildings within specific distances as chosen by user.

In an embodiment, the present disclosure discloses a method for publishing screens facility. Publishing screen facility is enabled for technicians, operators and other executives based on their role, need and business objective to display relevant metrics, KPI's, KGI's along with other elements such as recent developments, measures taken, trends and patterns. In a multi operator facility, screens have the option to display based on the skill, name, and type of role manning specific location. In case where more than one operator is present, the screens shall rotate based on availability of operators.

In an embodiment, discovery of unknown factors and additional insights occur in the pattern detector 313. Discovering unknown factors and additional insights is an ongoing process and multiple mathematical and statistical models are used to identify patterns of operations. Patterns are observed for individual data points and indicators, for combination of data points and indicators, deviations from expected, patterns of causes, patterns of issue resolution and patterns for use of indicators.

In an embodiment, the method of discovering unknown factors and additional insights comprises assessing indicator performance, assessing pattern of indicator performance, assessing pattern of deviation and cause, assessing pattern of issue resolution, assessing pattern of use of indicators, assessing pattern of other data 210, detecting changes in the site design, assets, set points, schedules, etc., and detecting future patterns and issue.

In an embodiment, the present disclosure provides a method for assessing indicator performance. Input from navigation builder 310 forms key input to this module, along with inputs from publisher 322, master monitor 321, and change detector 314. Based on the outcome of the metrics, indicator prioritization is carried out in navigation builder 310 module. The input from navigation builder 310 is used to determine the indicator performance over a period of time considering other inputs from change detector 314 module for any adjustments. Trend of the indicator is assessed along with indicators of similar nature within facility and across comparable facilities.

In an embodiment, the present disclosure provides a method for assessing pattern of indicator performance. Based on input from indicator performance, the pattern is observed in correlation with other factors which are predetermined based on the type of indicator, end use of establishment and KGI's defined. Inputs from change detector 314 are used appropriately while pattern of indicator performance is derived.

In an embodiment, the present disclosure provides method for assessing pattern of deviations and causes. History of deviations and causes are accessed by the pattern detector 313, while the present period deviations are analyzed for arriving at patterns. Assessing pattern of deviation and causes also interfaces with corresponding information management systems such as MIS, vendor service management, maintenance systems to track and consider the status of past deviations and causes before providing final view.

In an embodiment, the present disclosure provides a method for assessing pattern of issue resolution. Periodic outcomes of deviations and causes are monitored to detect the drop in issues resolved. Correlations are performed with vendor management system, vendor service management system and MIS system of enterprise to relate the effect of vendors, technicians on the issue resolution. Repetitions in issues, downtime occurrence, impact of them to the overall policy and Service Level Agreements (SLA's) are tracked in this module. Fixes successful for similar issues in other parts of the enterprise 104 are highlighted (based on self-learning mode search mechanism) as options to the technicians where the issue is repeated for same cause or related aspects.

In an embodiment, the present disclosure provides a method for assessing pattern of use of indicators. The indicators that are used across profiles are tracked and recorded. Facilities/buildings with similar characteristics are analyzed for their use of indicators by different profiles. Based on the type of indicator used by the corresponding profiles, the performance of the facility is tracked in their respective parameters. Based on the above analysis, indicator usage effectiveness index is formed and published for users of similar profiles for reference alongside their preferred indicators.

In an embodiment, the present disclosure provides a method for assessing pattern of other data 210. Identifying factors for efficient performance of certain objects (site, assets etc.). Assess patterns of data quality as stored in the database 101. Fixes carried out by technicians and vendors are monitored for effectiveness of performance in both operational and cost aspects. Vendor performance on issue resolution and the SLA adherence is monitored across the enterprise to leverage good practices and cost advantage. Facilities/buildings/systems with good performance are tracked and factors such as operating pattern, configuration details etc. are highlighted for facilities/buildings with similar infrastructure and operating conditions.

In an embodiment, the present disclosure discloses a method for detecting changes in site design, assets, set points, schedules. Changes to the site can occur at multiple levels starting from object, system, services offered, format of the facility, configuration changes, policy changes (schedules, set points), infrastructure change, design changes etc. Some of the changes are detected by data captured through interfaces with respective information systems. Algorithms are enabled to detect the variations in each of the parameters provided in examples above and adjust the metrics, KPI's and KGI's based on the changes detected. Root causes provided based on metrics and KPI performance are aligned through self-learning mechanism and from inbuilt library to adjust to the changes sensed from the change detector 314 module. The output of this module is provided to modules such as KPI selector 307 and KPI fine-tuner 308, normalizer 309, navigation builder 310 and publisher 322.

In an embodiment, the present disclosure discloses a method for detecting future patterns and issues. Based on the observations of indicators, KPI's and KGI's statistical methods are used to detect future performance based on policies, forecasts of weather, utility, maintenance effectiveness, past performance history, data from peers of similar infrastructure and operating conditions. Detecting future patterns and issues helps in enabling the operators, managers and management teams to be prepared on handling future issues or involve right teams from vendors and technicians to prevent any eventualities or perform corrective actions.

In an embodiment, the present disclosure discloses a method for validating indicators and correcting the indicators dynamically. This step takes place in the algorithm tuner 316. Based on the patterns, changes detected and forecasted in the previous step, here the decision is taken on whether there needs to be any change in goals, indicators, metrics, calculation methodologies, one or more thresholds, normalization/comparability matrix, views, navigation flows, profile of the users, solutions provided, types of reports/alarms generated and any other parameter as needed.

Computer System

Figure 5:
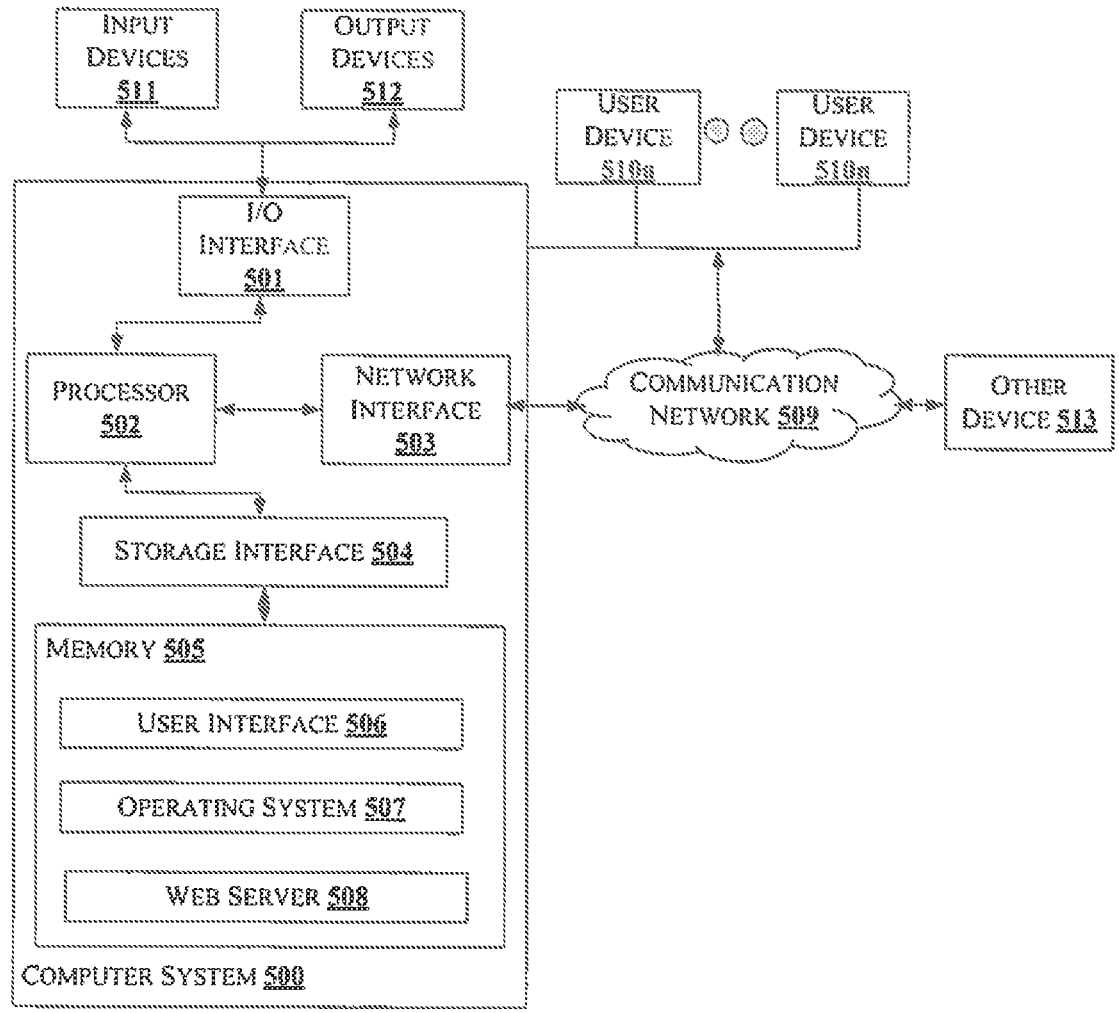
FIG. 5 shows a general purpose computing unit for dynamically managing performance indicators for an enterprise to address goals of facility management operations in accordance with some embodiments of the present disclosure.

FIG. 5 illustrates a block diagram of an exemplary computer system 500 for implementing embodiments consistent with the present disclosure. In an embodiment, the computer system 500 is used to implement the method for dynamically managing performance indicators for an enterprise to address goals of facility operations management. The computer system 500 may comprise a central processing unit ("CPU" or "processor") 502. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), Wi-Max, or the like), etc.

Using the I/O interface 501, the computer system 500 may communicate with one or more I/O devices. For example, the input device 511 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 512 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the service operator through a communication network 509. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 509 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 703 and the communication network 509, the computer system 500 may communicate with the one or more service operators.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 500 may implement a web browser 507 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment of the present disclosure, the KPIs are aligned with the goals (KGIs) of managing and monitoring a system.

In an embodiment, the present disclosure discloses a method and a system which is efficient in problem identification, traceability and resolution by providing impact along with information on an event, occurrence of the event and deviation of the event from expected value.

In an embodiment, the present disclosure discloses a method and a system for automatic flagging of events. If a user navigates to a particular issue, a follow-up loop is created for monitoring action and resolution.

In an embodiment of the present disclosure, only limited and useful information is provided to the user. Further, guided flexibility is provided to the user for navigation, customization/differentiation based on use, location etc.

In an embodiment built-in flexibility is provided for system to evolve. Value is added by identifying and indicating why a system works efficiently, hence helping in identifying unknown factors which affect system performance.

In an embodiment of the present disclosure, normalizing values of the comparability matrix reduces time taken during comparing. Hence, the indicators utility is maximized.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of dynamically managing performance indicators for an enterprise to address goals of facility operations management, comprising:

integrating, by an auto-learning performance device operations data associated with an enterprise, received from one or more sources and an indicator management database;

deriving, by the auto-learning performance device, one or more Key Performance Indicators (KPIs), one or more thresholds and one or more metrics based on the integrated data and goals of facility operations management;

determining, by the auto-learning performance device, one or more factors affecting performance of the KPIs and one or more factors affecting performance of the one or more thresholds;

creating, by the auto-learning performance device, a comparability matrix based on the one or more factors affecting performance of the KPIs and the one or more factors affecting performance of the one or more thresholds to identify clusters of objects, corresponding data points and techniques to be used for normalization of the one or more KPIs;

normalizing, by the auto-learning performance device, the one or more KPIs based on at least one of the clusters of objects, the corresponding data points or the techniques for normalization to provide normalized data;

assessing, by the auto-learning performance device, performance of KPIs based on the one or more thresholds, the comparability matrix and associated patterns of the normalized data to derive KPI performance insights;

providing, by the auto-learning performance device, the one or more KPIs, the KPI performance insights and the one or more factors affecting performance of the KPIs to a user, through an interactive visualization based on user profile;

fine-tuning, by the auto-learning performance device, the one or more KPIs based on the performance of KPIs, the one or more thresholds and the one or more metrics through machine-learning techniques;

enhancing the auto-learning performance device, along with the one or more KPIs and the interactive visualization based on one or more patterns of usage of the interactive visualization and the fine-tuning, thereby dynamically managing performance indicators for an enterprise to address the goals of facility operations management;

wherein the one or more KPIs are classified as at least one of asset indicators and process indicators, the asset indicators including at least one of energy efficiency ratio (EER) and coefficient of performance (COP) for heating, ventilation and air condition (HVAC) assets, the process indicators including efficiency of a cooling process by the HVAC assets.

2. The method of claim 1, wherein the operations data comprises at least one of enterprise type, enterprise requirements, number of sensors and measurement units of devices present in the enterprise.

3. The method as claimed in claim 1, wherein the operations data is received from at least one of the one or more sources comprising, a Building Management System (BMS), site instrumentation, one or more utility system interfaces, one or more vendor system interfaces, one or more web interfaces and an enterprise Management Information System (MIS).

4. The method as claimed in claim 1, wherein the goals used for deriving KPIs are defined in the form of one or more Key goal indicators (KGI).

5. The method as claimed in claim 4, wherein the indicator management database comprises the one or more KGIs, KPIs associated with the KGIs, the one or more thresholds, the one or more metrics and polices contributing to the performance of KPI's to be maintained which are categorized based on one or more of type of enterprise, operations, location, building attributes, make and model of assets.

6. The method as claimed in claim 1, wherein deriving KPIs comprises determining frequency at which each KPI is calculated.

7. The method as claimed in claim 1, wherein the one or more thresholds are derived based on at least one of historical data and data associated with the indicator management database.

8. The method as claimed in claim 1, wherein the one or more thresholds are tuned based on real time data.

9. The method as claimed in claim 1, wherein a graphical user interface (GUI) provides insights on improvement opportunities, preventive maintenance, problem resolutions and usage of KPIs.

10. An auto-learning performance device comprising:
a processor; and
a memory, communicatively coupled to the processor, which stores processor executable instructions, which, on execution, causes the processor to:
integrate operations data associated with an enterprise, received from one or more sources and an indicator management database;
derive one or more Key Performance Indicators (KPIs), one or more thresholds and one or more metrics based on the integrated data and goals of facility operations management;
determining, by the auto-learning performance system, one or more factors affecting performance of the KPIs and one or more factors affecting performance of the one or more thresholds;
create a comparability matrix based on the one or more factors affecting performance of the KPIs and the one or more factors affecting performance of the one or more thresholds to identify clusters of objects, corresponding data points and techniques to be used for normalization of the one or more KPIs;
normalize the one or more factors affecting the performance of the KPIs based on at least one of the clusters of objects, the corresponding data points or the techniques for normalization to provide normalized data;
assess performance of KPIs based on the one or more thresholds, the comparability matrix and associated patterns of the normalized data to derive KPI performance insights;
provide the one or more KPIs, the KPI performance insights and the one or more factors affecting performance of the KPIs to a user, through an interactive visualization based on user profile;
fine-tune the one or more KPIs based on the performance of KPIs, the one or more thresholds and the one or more metrics through machine-learning techniques;
enhance along with the one or more KPIs and the interactive visualization based on one or more patterns of usage of the interactive visualization and the fine-tuning, thereby dynamically managing performance indicators for an enterprise to address the goals of facility operations management;
wherein the one or more KPIs are classified as at least one of asset indicators and process indicators, the asset indicators including at least one of energy efficiency ratio (EER) and coefficient of performance (COP) for heating, ventilation and air condition (HVAC) assets, the process indicators including efficiency of a cooling process by the HVAC assets.

11. The auto-learning performance system as claimed in claim 10, wherein the operations data comprises at least one of enterprise type, enterprise requirements, number of sensors and measurement units of devices present in the enterprise.

12. The auto-learning performance system as claimed in claim 10, wherein the operations data is received from at least one of the one or more sources comprising, a Building Management System (BMS), site instrumentation, one or more utility system interfaces, one or more vendor system interfaces, one or more web interfaces and an enterprise Management Information System (MIS).

13. The auto-learning performance system as claimed in claim 10, wherein the goals used for deriving KPIs are defined in the form of one or more Key goal indicators (KGI).

14. The auto-learning performance system as claimed in claim 13, wherein the indicator management database comprises the one or more KGIs, KPIs associated with the KGIs, the one or more thresholds, the one or more metrics and polices contributing to the performance of KPIs to be maintained which are categorized based on one or more of type of enterprise, operations, location, building attributes, make and model of assets.

15. The auto-learning performance system as claimed in claim 10, wherein deriving KPIs comprises determining frequency at which each KPI is calculated.

16. The auto-learning performance system as claimed in claim 10, wherein the one or more thresholds are derived based on at least one of historical data and data associated with the indicator management database.

17. The auto-learning performance system as claimed in claim 10, wherein the one or more thresholds are tuned based on real time data.

18. The auto-learning performance system as claimed in claim 10, wherein a graphical user interface (GUI) provides insights on improvement opportunities, preventive maintenance, problem resolutions and usage of KPIs.

19. A non-transitory computer-readable medium storing instructions for dynamically managing performance indicators for an enterprise to address goals of facility operations management, wherein upon execution of the instructions by one or more processors, the processors perform operations comprising:

integrating operations data associated with an enterprise, received from one or more sources and an indicator management database;

deriving one or more Key Performance Indicators (KPIs), one or more thresholds and one or more metrics based on the integrated data and goals of facility operations management;

determining one or more factors affecting performance of the KPIs and one or more factors affecting performance of the one or more thresholds;

creating a comparability matrix based on the one or more factors affecting performance of the KPIs and the one or more factors affecting performance of the one or more thresholds to identify clusters of objects, corresponding data points and techniques to be used for normalization of the one or more KPIs;

normalizing the one or more factors affecting the performance of the KPIs based on at least one of the clusters of objects, the corresponding data points or the techniques for normalization to provide normalized data;

assessing performance of KPIs based on the one or more thresholds, the comparability matrix and associated patterns of the normalized data to derive KPI performance insights; providing the one or more KPIs, the KPI performance insights and the one or more factors affecting performance of the KPIs to a user, through an interactive visualization based on user profile;

fine-tuning the one or more KPIs based on the performance of KPIs, the one or more thresholds and the one or more metrics through machine-learning techniques;

enhancing along with the one or more KPIs and the interactive visualization based on one or more patterns of usage of the interactive visualization and the fine-tuning, thereby dynamically managing performance indicators for an enterprise to address the goals of facility operations management;

wherein the one or more KPIs are classified as at least one of asset indicators and process indicators, the asset indicators including at least one of energy efficiency ratio (EER) and coefficient of performance (COP) for heating, ventilation and air condition (HVAC) assets, the process indicators including efficiency of a cooling process by the HVAC assets.

* * * * *